US011101679B2

(12) United States Patent
Battle et al.

(10) Patent No.: US 11,101,679 B2
(45) Date of Patent: Aug. 24, 2021

(54) ELECTRONIC DEVICE FOR CHANGING CHARGING PARAMETER DEPENDING ON STATE OF BATTERY AND CONTROL METHOD THEREOF

(71) Applicant: Samsung Electronics Co., Ltd., Gyeonggi-do (KR)

(72) Inventors: Jason Michael Battle, Gyeonggi-do (KR); Ankit Yadu, Bangalore (IN); Aravinda Reddy Mandli, Bangalore (IN); Krishnan Seethalakshmy Hariharan, Bangalore (IN); Piyush Tagade, Bangalore (IN); Rajkumar Subhash Patil, Bangalore (IN)

(73) Assignee: Samsung Electronics Co.. Ltd

( * ) Notice: Subject to any disclaimer, the term of this patent is extended or adjusted under 35 U.S.C. 154(b) by 701 days.

(21) Appl. No.: 15/954,116

(22) Filed: Apr. 16, 2018

(65) Prior Publication Data

US 2018/0301922 A1  Oct. 18, 2018

(30) Foreign Application Priority Data

Apr. 14, 2017 (KR) .......................... 10-2017-0048772

(51) Int. Cl.
*H02J 7/00* (2006.01)
*H02J 7/14* (2006.01)
*G06F 1/26* (2006.01)

(52) U.S. Cl.
CPC ............ *H02J 7/0072* (2013.01); *G06F 1/263* (2013.01)

(58) Field of Classification Search
USPC ........................................................ 320/109
See application file for complete search history.

(56) References Cited

U.S. PATENT DOCUMENTS 5,955,869 A * 9/1999 Rathmann ............. H01M 10/42
320/132
6,025,695 A * 2/2000 Friel ................... H02J 7/00036
320/106
7,489,107 B2 2/2009 Hartley et al.
7,528,574 B1 5/2009 Adkins et al.
(Continued)

FOREIGN PATENT DOCUMENTS

JP  2014-105995  6/2014

OTHER PUBLICATIONS

International Search Report dated Aug. 6, 2018 issued in counterpart application No. PCT/KR2018/004378, 10 pages.

*Primary Examiner* — Alexis B Pacheco
(74) *Attorney, Agent, or Firm* — The Farrell Law Firm, P.C.

(57) ABSTRACT

Disclosed is an electronic device including a battery, a charging circuit configured to charge the battery, a measurement circuit configured to measure a state of the battery, and a processor configured to be electrically connected with the battery, the charging circuit, and the measurement circuit, to charge the battery using the charging circuit set by a first charging parameter, determine state information corresponding to a state of the battery based on data associated with the state of the battery obtained using the measurement circuit, determine a second charging parameter for reducing loss of a capacity of the battery based on the state information, and charge the battery using the charging circuit set by the second charging parameter.

16 Claims, 11 Drawing Sheets

(56) References Cited

U.S. PATENT DOCUMENTS

| | | |
|---|---|---|
| 8,125,189 B2 | 2/2012 | Formenti |
| 8,368,357 B2 | 2/2013 | Ghantous et al. |
| 8,374,807 B2 | 2/2013 | Hall |
| 8,427,112 B2 | 4/2013 | Ghantous et al. |
| 8,513,921 B2 | 8/2013 | Berkowitz et al. |
| 8,643,342 B2 | 2/2014 | Mehta et al. |
| 8,729,862 B2 | 5/2014 | Yebka et al. |
| 8,754,611 B2 | 6/2014 | Greening et al. |
| 8,791,669 B2 | 7/2014 | Ghantous et al. |
| 9,035,621 B2 | 5/2015 | Berkowitz et al. |
| 9,071,071 B2 | 6/2015 | Greening et al. |
| 9,121,910 B2 | 9/2015 | Maluf et al. |
| 9,153,988 B2 | 10/2015 | Iwane et al. |
| 9,236,748 B2 | 1/2016 | Barsukov et al. |
| 9,331,513 B2 | 5/2016 | Greening et al. |
| 9,791,513 B2 | 10/2017 | Maluf et al. |
| 2001/0033502 A1* | 10/2001 | Blair .................. H02J 7/0022 363/65 |
| 2005/0248315 A1 | 11/2005 | Hartley et al. |
| 2006/0232244 A1 | 10/2006 | Vieira Formenti |
| 2008/0253053 A1 | 10/2008 | Formenti |
| 2009/0256528 A1 | 10/2009 | Greening et al. |
| 2009/0259420 A1 | 10/2009 | Greening et al. |
| 2010/0121591 A1 | 5/2010 | Hall |
| 2011/0156661 A1 | 6/2011 | Mehta et al. |
| 2011/0316548 A1 | 12/2011 | Ghantous et al. |
| 2012/0032648 A1 | 2/2012 | Ghantous et al. |
| 2012/0153902 A1 | 6/2012 | Yebka et al. |
| 2012/0203483 A1 | 8/2012 | Ghantous et al. |
| 2013/0066573 A1* | 3/2013 | Bond .................. G01R 31/392 702/63 |
| 2013/0154548 A1 | 6/2013 | Berkowitz et al. |
| 2013/0154577 A1 | 6/2013 | Iwane et al. |
| 2014/0021959 A1 | 1/2014 | Maluf et al. |
| 2014/0062415 A1 | 3/2014 | Barsukov et al. |
| 2014/0092375 A1* | 4/2014 | Raghavan ............. H01M 10/48 356/32 |
| 2014/0197805 A1 | 7/2014 | Greening et al. |
| 2014/0217984 A1* | 8/2014 | Banerjee ............... H01M 10/48 320/128 |
| 2014/0312912 A1 | 10/2014 | Berkowitz et al. |
| 2014/0350877 A1 | 11/2014 | Chow et al. |
| 2015/0219722 A1 | 8/2015 | Maluf et al. |
| 2016/0087461 A1 | 3/2016 | Greening et al. |
| 2016/0116548 A1* | 4/2016 | Ghantous ............ H01M 10/425 702/63 |
| 2017/0170476 A1* | 6/2017 | Yamamoto ............ H01M 4/587 |
| 2017/0285111 A1* | 10/2017 | Fife ............ H02J 3/46 |
| 2018/0301922 A1* | 10/2018 | Battle .................. H02J 7/0072 |

* cited by examiner

ELECTRONIC DEVICE FOR CHANGING CHARGING PARAMETER DEPENDING ON STATE OF BATTERY AND CONTROL METHOD THEREOF

CROSS-REFERENCE TO RELATED APPLICATION(S)

This application is based on and claims priority under 35 U.S.C. § 119 to Korean Patent Application No. 10-2017-0048772, filed on Apr. 14, 2017, in the Korean Intellectual Property Office, the disclosure of which is incorporated herein by reference its entirety.

BACKGROUND

1. Field

The disclosure relates generally to an electronic device, and more particularly, to a method for controlling a state of charge (SOC) of a battery of an electronic device.

2. Description of Related Art

An electronic device, such as a smartphone, a television (TV), or a tablet personal computer (PC), includes highly specified hardware that conveniently provides various services to a user. Such devices, therefore, require a battery capable of supplying sufficient power to operate this hardware. In general, the electronic device may include a battery and may receive power from the battery, in order for the internal hardware to operate. When the battery is discharged, the electronic device may receive power from an external power supply to charge the battery.

Conventionally, however, it is difficult to install a battery having constant charging capacity due to space restrictions. Thus, technologies have been developed for efficiently managing battery power using a limited battery capacity and fast charging of a discharged battery. However, such fast battery conventionally causes as a battery degradation phenomenon of reduced battery capacity, thus reducing a state of health (SOH) of the battery.

SUMMARY

That is, a battery may deteriorate in capacity (or performance) due to charging repetition, and in turn, hardware in an electronic device may operate abnormally. Since battery replacement is difficult, the entire electronic device should be replaced.

The battery should be charged by a proper method depending on a state of the battery to prevent deterioration in performance. However, it is difficult for a user to verify a state of the battery and charge the battery in a proper time and environment depending on the verified state. Since a state of the battery continues to change while the battery is charged, it is difficult to efficiently manage the battery.

In addition, a constant current constant voltage (CCCV) charging method for supplying a constant current until a predetermined time in consideration of an SOC of the battery and supplying a constant voltage after the predetermined time may have a limitation in enhancing battery charging efficiency, particularly since the state of the battery continues to change depending on a charging cycle of the battery.

Aspects of the present disclosure are to address at least the above-mentioned problems and/or disadvantages and to provide at least the advantages described below. Accordingly, an aspect of the present disclosure is to provide an electronic device for supplying a proper current and voltage to a battery under a specified constraint condition depending on a state of the charged battery and a control method thereof.

In accordance with an embodiment, an electronic device may include a battery, a charging circuit configured to charge the battery, a measurement circuit configured to measure a state of the battery, and a processor configured to be electrically connected with the battery, the charging circuit, and the measurement circuit, and configured to charge the battery using the charging circuit set by a first charging parameter, determine state information corresponding to the state of the battery based on data associated with the state of the battery, the state being obtained using the measurement circuit, determine a second charging parameter for reducing loss of a capacity of the battery based on the state information, and charge the battery using the charging circuit set by the second charging parameter.

In accordance with another embodiment, an electronic device may include a battery, a charging circuit, and a measurement circuit configured to be electrically connected with the battery and the charging circuit, and configured to charge the battery using the charging circuit set by a first charging parameter, determine state information corresponding to a state of the battery based on data associated with the state of the battery, determine a second charging parameter for reducing loss of a capacity of the battery based on the state information, and charge the battery using the charging circuit set by the second charging parameter.

In accordance with another embodiment, provided is a non-transitory computer-readable storage medium for storing a program for performing a method, which may include charging a battery using a charging circuit set by a first charging parameter, determining state information corresponding to a state of the battery based on data associated with the state of the battery, the state being obtained using a measurement circuit, determining a second charging parameter for reducing loss of a capacity of the battery based on the state information, and charging the battery using the charging circuit set by the second charging parameter.

An electronic device according to embodiments may minimize loss of a capacity (or performance) of a battery and may prevent an excessive current or voltage from being supplied to the battery by changing voltage or current supplied to the battery under a specified constraint condition depending on a state of the battery, and charging the battery with the changed voltage or current. Thus, the electronic device and the battery may increase in safety and an SOH of the battery may increase.

Since a main processor and a sub-processor of the electronic device according to embodiments may complement each other to calculate a charging parameter depending on an amount of calculation (or power consumption) for calculating the charging parameter for charging the battery, the electronic device may reduce additional power consumption.

In addition, various effects directly or indirectly ascertained through the present disclosure may be provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
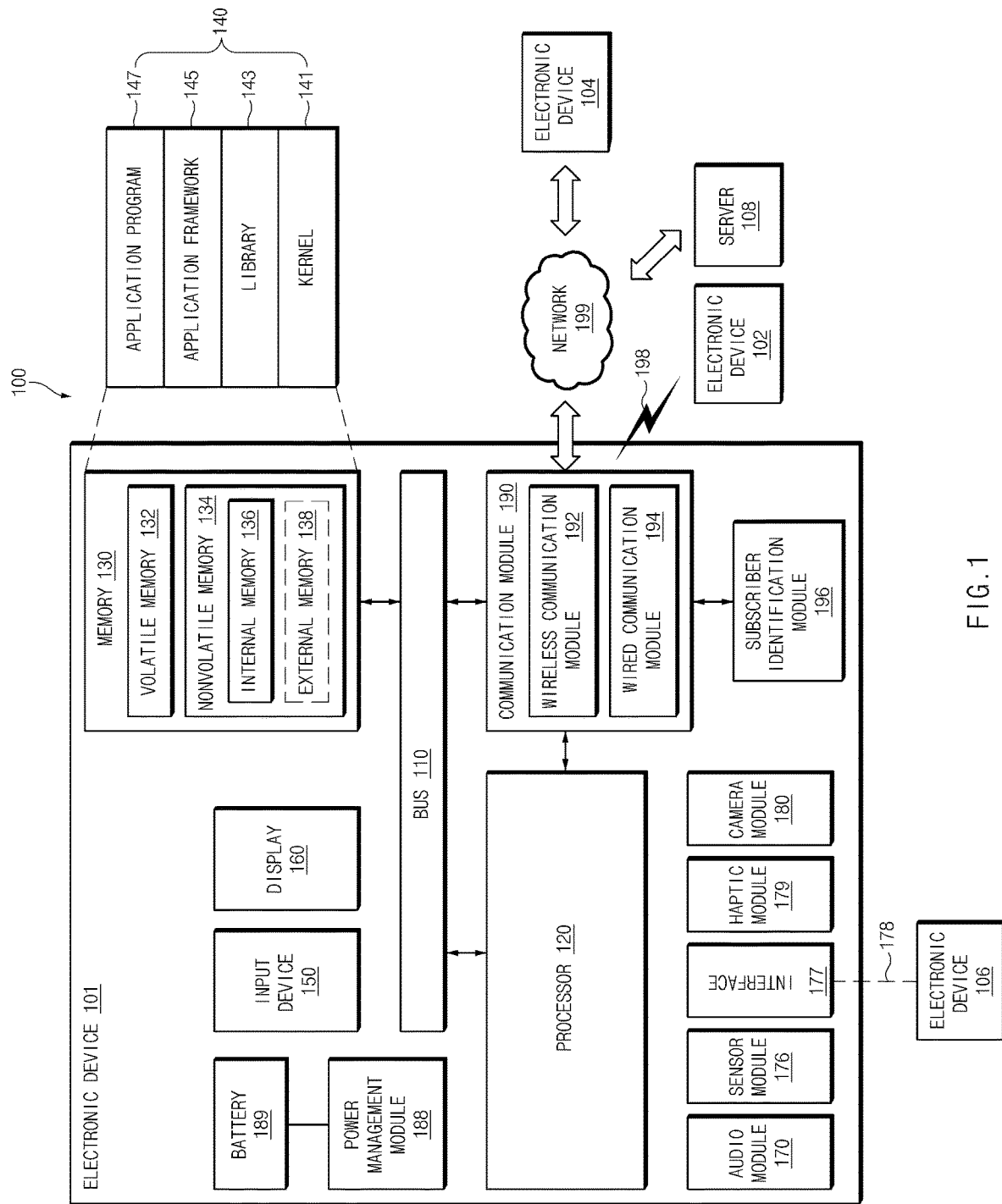
FIG. 1 illustrates a configuration of an electronic device in a network environment according to embodiments.

Embodiments of the present disclosure will be described with reference to accompanying drawings. Accordingly, those of ordinary skill in the art will recognize that modification to the embodiments described herein can be variously made without departing from the scope and spirit of the present disclosure. With regard to description of the drawings, similar elements may be marked by similar reference numerals.

Embodiments of the present disclosure and terms used herein are not intended to limit the technologies described in the present disclosure to specific embodiments, and it should be understood that the embodiments and the terms include modifications, equivalents, and/or alternatives on the corresponding embodiments described herein. With regard to description of drawings, similar elements may be marked by similar reference numerals. The terms of a singular form may include plural forms unless otherwise specified.

In the disclosure, the expressions "A or B", "at least one of A and/or B", "at least one of A and/or B", "A, B, or C", or "at least one of A, B, and/or C", and the like may include any and all combinations of one or more of the associated listed items. Terms such as "first," or "second," may express their elements regardless of their priority or importance and may be used to distinguish one element from another element but are not limited to these components. When a first element is referred to as being operatively or communicatively coupled with/to or connected to a second element, the first element may be directly coupled with/to or connected to the second element or an intervening third element may be present.

According to the situation, the expression "adapted to or configured to" used herein may be interchangeably used with "suitable for", "having the capacity to", "changed to", "made to", "capable of" or "designed to" in hardware or software. The expression "a device configured to" may indicate that the device is "capable of" operating together with another device or other components. For example, a "processor configured to (or set to) perform A, B, and C" may indicate an embedded processor for performing corresponding operations or a generic-purpose processor (e.g., a central processing unit (CPU) or an application processor (AP)) which performs corresponding operations by executing one or more software programs which are stored in a memory device.

The term "module" used herein may include a unit, which is implemented with hardware, software, or firmware, may be interchangeably used with the terms "logic", "logical block", "component" or "circuit", may be a minimum unit of an integrated component or a part thereof, or may be a minimum unit for performing one or more functions or a part thereof. The "module" may be implemented mechanically or electronically and may include an application-specific IC (ASIC) chip, a field-programmable gate array (FPGA), and a programmable-logic device for performing some operations, which are known or will be developed in the future.

An electronic device according to embodiments of the present disclosure may include at least one of portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or motion picture experts group (MPEG-1 or MPEG-2) audio layer 3 (MP3) players), portable medical devices (e.g., heartbeat measuring modules, blood glucose monitoring modules, blood pressure measuring modules, and body temperature measuring modules), cameras, or wearable devices.

The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). The electronic device may include at least one of televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

The electronic device may also include at least one of navigation devices, a global navigation satellite system (GNSS), event data recorders (EDRs) (e.g., black box for a car, a ship, or a plane), vehicle infotainment devices (e.g., head-up display for vehicle), industrial or home robots, drones, automated teller machines (ATMs), points of sales (POS) devices, measuring instruments (e.g., water meters, electricity meters, or gas meters), or Internet of things (IoT) devices, such as light bulbs, sprinkler devices, fire alarms, thermostats, or street lamps). The electronic device herein may not be limited to the above-described devices, and may provide functions of a plurality of devices, such as smartphones having a measurement function of personal biometric information (e.g., heart rate or blood glucose). In this disclosure, the term "user" may refer to a person who uses an electronic device or to an artificial intelligence electronic device that uses the electronic device.

An electronic device according to embodiments may minimize loss of a capacity (or performance) of a battery and may prevent an excessive current or voltage from being supplied to the battery by changing voltage or current supplied to the battery under a specified constraint condition depending on a state of the battery, and charging the battery with the changed voltage or current. Thus, the electronic device and the battery may increase in safety and an SOH of the battery may increase.

Since a main processor and a sub-processor of the electronic device according to embodiments may complement each other to calculate a charging parameter depending on an amount of calculation (or power consumption) for calculating the charging parameter for charging the battery, the electronic device may reduce additional power consumption.

In addition, various effects directly or indirectly ascertained through the present disclosure may be provided.

FIG. 1 illustrates a block diagram of an electronic device 101 in a network environment 100, according to embodiments. Referring to FIG. 1, under the network environment 100, the electronic device 101 may communicate with an electronic device 102 through local wireless communication 198, may communication with an electronic device 104 or a server 108 through a network 199, and may communicate with the electronic device 104 through the server 108.

The electronic device 101 may include a bus 110, a processor 120, a memory 130, an input device 150 (e.g., a micro-phone or a mouse), a display device 160, an audio module 170, a sensor module 176, an interface 177, a haptic module 179, a camera module 180, a power management module 188, a battery 189, a communication module 190, and a subscriber identification module 196. The electronic device 101 may not include at least one of the above-described elements or may further include other element(s).

The bus 110 may interconnect the above-described elements 120 to 190 and may include a circuit for conveying signals (e.g., a control message or data) between the above-described elements.

The processor 120 may include one or more of a central processing unit (CPU), an AP, a graphic processing unit (GPU), an image signal processor (ISP) of a camera or a communication processor (CP), and may be implemented with a system on chip or a system in package (SiP). For example, the processor 120 may drive an operating system (OS) or an application to control at least one of another hardware or software element connected to the processor 120 and may process and compute various data. The processor 120 may load a command or data, which is received from at least one of other elements (e.g., the communication module 190), into a volatile memory 132 to process the command or data and may store the result data into a nonvolatile memory 134.

The memory 130 may include the volatile memory 132 or the nonvolatile memory 134. The volatile memory 132 may include, for example, a random access memory (RAM) (e.g., a dynamic RAM (DRAM), a static RAM (SRAM), or a synchronous DRAM (SDRAM)). The nonvolatile memory 134 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 134 may be configured in the form of an internal memory 136 or an external memory 138 which is available through connection only if necessary, according to the connection with the electronic device 101. The external memory 138 may further include a flash drive such as compact flash (CF), secure digital (SD), micro secure digital (micro-SD), mini secure digital (mini-SD), extreme digital (xD), a multimedia card (MMC), or a memory stick, and may be operatively or physically connected with the electronic device 101 in a wired manner (e.g., a cable or a universal serial bus (USB)) or a wireless (e.g., Bluetooth) manner.

For example, the memory 130 may store at least one different software element, such as a command or data associated with the program 140, of the electronic device 101. The program 140 may include a kernel 141, a library 143, an application framework 145 and application programs (i.e, "applications") 147.

The input device 150 may include a microphone, a mouse, or a keyboard that is physically connected to the electronic device 101 or a virtual keyboard displayed through the display 160.

The display 160 may include a hologram device or a projector, a control circuit to control a relevant device, a liquid crystal display (LCD), a light emitting diode (LED) display, an organic LED (OLED) display, a microelectromechanical systems (MEMS) display, or an electronic paper display. The display may be flexibly, transparently, or wearably implemented and may include touch circuitry, which is able to detect a user's input, such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may project a stereoscopic image in a space using interference of light. The projector may project light onto a screen to display an image. The screen may be located inside or outside the electronic device 101.

The audio module 170 may convert sound into an electrical signal or an electrical signal into sound, may acquire sound through the input device 150 (e.g., a microphone) or may output sound through an output device (e.g., a speaker or a receiver) included in the electronic device 101, an external electronic device 102, or an electronic device 106 connected with the electronic device 101.

The sensor module 176 may measure or detect an internal operating state (e.g., power or temperature) of the electronic device 101 or an external environment state (e.g., an altitude, a humidity, or brightness) to generate an electrical signal or a data value corresponding to the information of the measured state or the detected state, and may include at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, or an electrocardiogram (ECG) sensor), a temperature sensor, a humidity sensor, an illuminance sensor, or an ultraviolet (UV) sensor. The sensor module 176 may further include a control circuit for controlling at least one or more sensors included therein, and may be controlled by using the processor 120 or a processor (e.g., a sensor hub) separate from the processor 120. When the separate processor (e.g., a sensor hub) is used and is in a sleep state, the separate processor may operate without awakening the processor 120 to control at least a portion of the operation or the state of the sensor module 176.

The interface 177 may include a high definition multimedia interface (HDMI), a universal serial bus (USB), an optical interface, a recommended standard 232 (RS-232), a D-subminiature (D-sub), a mobile high-definition link (MHL) interface, a secure digital (SD) card/multi-media card (MMC) interface, or an audio interface. A connector 178 may physically connect the electronic device 101 and the electronic device 106, and may include a USB connector, an SD card/MMC connector, or an audio connector (e.g., a headphone connector).

The haptic module 179 may convert an electrical signal into mechanical stimulation (e.g., vibration or motion) or into electrical stimulation. For example, the haptic module 179 may apply tactile or kinesthetic stimulation to a user, and may include a motor, a piezoelectric element, or an electric stimulator.

The camera module 180 may capture a still image and a moving picture and may include at least one lens (e.g., a wide-angle lens and a telephoto lens, or a front lens and a rear lens), an image sensor, an image signal processor, or a flash (e.g., a light emitting diode or a xenon lamp).

The power management module 188, which manages the power of the electronic device 101, may constitute at least a portion of a power management integrated circuit (PMIC).

The battery 189 may include a primary cell, a secondary cell, or a fuel cell and may be recharged by an external power source to supply power at least one element of the electronic device 101.

The communication module 190 may establish a communication channel between the electronic device 101 and an external device, may support wired communication or wireless communication through the established communication channel, may include a wireless communication module 192 or a wired communication module 194, and may communicate with the external device through a first network 198 (e.g. a wireless local area network such as Bluetooth or Infrared Data Association (IrDA)) or a second network 199 (e.g., a wireless wide area network such as a cellular network) through a relevant module among the wireless communication module 192 or the wired communication module 194.

The wireless communication module 192 may support cellular communication, local wireless communication, global navigation satellite system (GNSS) communication. The cellular communication may include long-term evolution (LTE), LTE Advance (LTE-A), code division multiple access (CDMA), wideband CDMA (WCDMA), universal mobile telecommunications system (UMTS), wireless broadband (WiBro), or global system for mobile communications (GSM). The local wireless communication may include wireless fidelity (Wi-Fi), WiFi direct, light fidelity (Li-Fi), Bluetooth®, Bluetooth low energy (BLE), Zigbee®, near field communication (NFC), magnetic secure transmission (MST), radio frequency (RF), or a body area network (BAN). The GNSS may include at least one of a global positioning system (GPS), a global navigation satellite system (Glonass), Beidou navigation satellite system (Beidou), the European global satellite-based navigation system (Galileo), or the like. In the present disclosure, "GPS" and "GNSS" may be interchangeably used.

According to an embodiment, when the wireless communication module 192 supports cellar communication, the wireless communication module 192 identify or authenticate the electronic device 101 within a communication network using the subscriber identification module (SIM) card 196, and may include a CP separate from the processor 120 (e.g., an AP). In this case, the communication processor may perform at least a portion of functions associated with at least one of elements 110 to 196 of the electronic device 101 in substitute for the processor 120 when the processor 120 is in an inactive (sleep) state, and together with the processor 120 when the processor 120 is in an active state. The wireless communication module 192 may include a plurality of communication modules, each supporting only a relevant communication scheme among cellular communication, local wireless communication, or a GNSS communication.

The wired communication module 194 may include a local area network (LAN) service, a power line communication, or a plain old telephone service (POTS).

For example, the first network 198 may employ Wi-Fi direct or Bluetooth for transmitting or receiving commands or data through wireless direct connection between the electronic device 101 and the first external electronic device 102. The second network 199 may include a telecommunication network (e.g., a computer network such as a LAN or a WAN, the Internet or a telephone network) for transmitting or receiving commands or data between the electronic device 101 and the second electronic device 104.

According to embodiments, the commands or the data may be transmitted or received between the electronic device 101 and the second external electronic device 104 through the server 108 connected with the second network 199. Each of the first and second external electronic devices 102 and 104 may be is the same type as or a different type than the electronic device 101. All or a part of operations that the electronic device 101 will perform may be executed by another or a plurality of electronic devices. According to an embodiment, when the electronic device 101 executes any function or service automatically or in response to a request, the electronic device 101 may not perform the function or the service internally, but may alternatively or additionally transmit requests for at least a part of a function associated with the electronic device 101 to any other device, which may execute the requested function or additional function and may transmit the execution result to the electronic device 101. The electronic device 101 may provide the requested function or service using the received result or may additionally process the received result to provide the requested function or service. To this end, for example, cloud computing, distributed computing, or client-server computing may be used.

Figure 2:
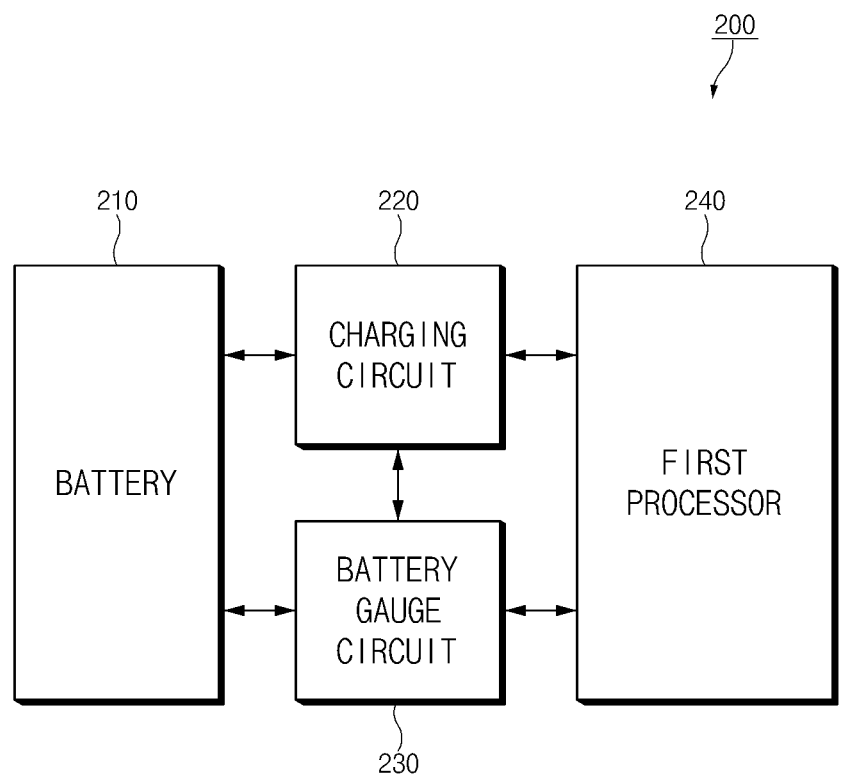
FIG. 2 illustrates a configuration of an electronic device according to an embodiment.

FIG. 2 illustrates a configuration of an electronic device according to an embodiment.

Referring to FIG. 2, an electronic device 200 may include a battery 210, a charging circuit 220, a battery gauge circuit 230, and a first processor 240.

The battery 210 may supply power to the electronic device 200 and may include at least one battery cell which may generate a voltage (e.g., 3.6 V to 4.4 V) of a specified range. A plurality of battery cells included in the battery 210 may be connected with each other in serial and/or in parallel.

The charging circuit 220 may control to charge the battery 210, such as by using power supplied from an external power supply. The charging circuit 220 may charge the battery 210 depending on a predetermined charging parameter which may correspond to, for example, an amount of current or a level of voltage, which should be supplied from the charging circuit 220 to charge the battery 210.

The battery gauge circuit 230 may verify a state of the battery 210, such as at least one of a voltage ($V_{bat}$), a current ($I_{bat}$), a temperature (T), a state of charge (SOC) (e.g., an amount of charging), an open-circuit voltage (OCV), and a capacity (or a chemical capacity) of the battery 210.

The first processor 240 may control an overall operation of the electronic device 200, may be a main processor which controls the overall operation of the electronic device 200, may be electrically connected with the battery 210, the charging circuit 220, and the battery gauge circuit 230, and may control at least one of the charging circuit 220 and the battery gauge circuit 230 to charge the battery 210.

The first processor 240 may control the charging circuit 220 to charge the battery 210. For example, the first processor 240 may obtain data associated with a state of the battery 210 from the battery gauge circuit 230 and may determine state information corresponding to the state of the battery 210 based on the obtained data, thus determining a charging parameter capable of being applied in the charging circuit 220 based on a battery model and the state information. The first processor 240 may generate a battery model (or model data) (e.g., a battery degradation model) for predicting a state of the battery 210 before determining the charging parameter, and thus may transmit a control signal including information about the determined charging parameter to the charging circuit 220 to control the charging circuit 220. For example, when a load of the first processor 240 meets a specified condition (e.g., when it takes a specified time or more to perform an arithmetic operation), the battery gauge circuit 230 may perform at least some of operations performed by the first processor 240, such as operations of calculating a charging parameter at the first processor 240.

According to another embodiment, a processor included in the battery gauge circuit 230 may determine the charging parameter. For example, the battery gauge circuit 230 may generate a battery model (or model data) (e.g., a battery degradation model) for predicting a state of the battery 210 and may determine a charging parameter capable of being applied in the charging circuit 220 based on the battery model and state information corresponding to the verified state of the battery 210. The charging parameter determined by the battery gauge circuit 230 may be applied to the charging circuit 220 through the first processor 240, or to the charging circuit 220 by the battery gauge circuit 230.

When the first processor 240 does not operate (e.g., when the electronic device 200 is in a sleep mode), the battery gauge circuit 230 may directly apply the determined charging parameter to the charging circuit 220. When a load of the battery gauge circuit 230 meets a specified condition, the first processor 240 may perform at least some of operations performed by the battery gauge circuit 230. The specified condition may be, for example, when it takes a specified time or more for the battery gauge circuit 230 to perform an arithmetic operation. The first processor 240 may determine a charging parameter and may control the charging circuit 220 using the determined charging parameter.

In other words, the battery gauge circuit 230 or the first processor 240 may generate the battery model and may determine a charging parameter based on information about a state of the battery 210 and the battery model.

Figure 3:
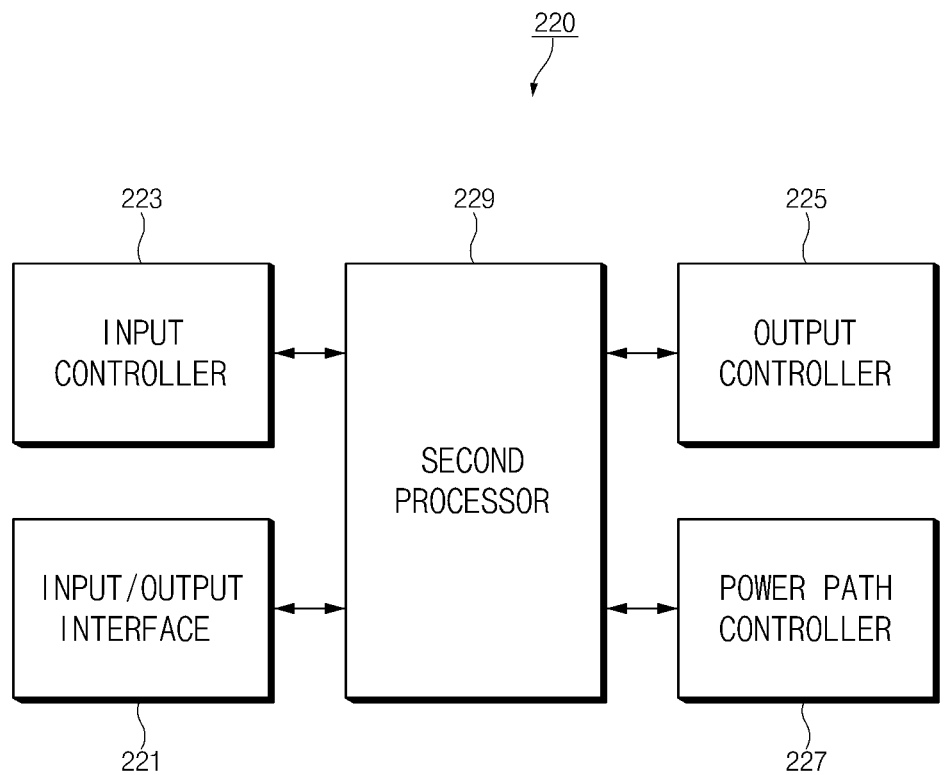
FIG. 3 illustrates a configuration of a charging circuit of an electronic device according to an embodiment.

FIG. 3 illustrates a configuration of a charging circuit of an electronic device according to an embodiment.

Referring to FIG. 3, a charging circuit 220 may include an input/output interface 221, an input controller 223, an output controller 225, a power path controller 227, and a second processor 229. For example, the charging circuit 220 may be implemented as a system on chip.

The input/output interface 221 (e.g., a serial interface) may receive a signal from another element of an electronic device 200 of FIG. 2 or may output a signal to the other element. For example, the input/output interface 221 may receive a control signal for controlling an amount of current or a level of voltage from a battery gauge circuit 230 or a first processor 240 of FIG. 2.

The input controller 223 may control power input from an external power supply. For example, the input controller 223 may control power input from the external power supply via a charging interface (e.g., a USB or a wireless charging coil). The input controller 223 may include, for example, a field effect transistor (FET) and may operate the FET to control power input from the external power supply.

The output controller 225 may control voltage input from the external power supply via the input controller 223. The output controller 225 may include a buck convertor and/or a boosting circuit, may decrease or increase the voltage using the buck convertor or the boosting circuit, may control a level of voltage (or an amount of current) output to a battery 210 of FIG. 2, and may include an FET and may operate the FET to control a level of voltage supplied to the battery 210.

The power path controller 227 may control a path of power supplied from the external power supply. For example, the power path controller 227 may divide the power supplied from the external power supply into a first path where power for charging the battery 210 is supplied and a second path where power for a load of a system of the electronic device 200 is supplied. When the battery 210 is not charged enough to load the system of the electronic device 200, the power path controller 227 may supply power to the second path.

The second processor 229 may control an overall operation of the charging circuit 220, may be a sub-processor which controls to execute charging of the electronic device 200, may control an operation of the charging circuit 220 depending on a command of the first processor 240, and may control at least one of the input/output interface 221, the input controller 223, the output controller 225, and the power path controller 227 to charge the battery 210.

The second processor 229 may control the input controller 223 to control power input from the external power supply.

The second processor 229 may control the output controller 225 to control an amount of current or a level of voltage, which is supplied to the battery 210. For example, the second processor 229 may receive a control signal via the input/output interface 221 and may control the output controller 225 based on information about a charging parameter included in the control signal to control an amount of current or a level of voltage, which is supplied to the battery 210. The second processor 229 may be, for example, a finite state model (FSM) and may be set (or changed) to a state corresponding to the control signal to control the input controller 223.

According to another embodiment, the second processor 229 and the first processor 240 may be implemented as one processor. For example, when the first processor 240 and the second processor 229 are implemented as one processor, the one processor may directly control the other elements (e.g., the input controller 223, the output controller 225, and the power path controller 227) of the charging circuit 220.

Figure 4:
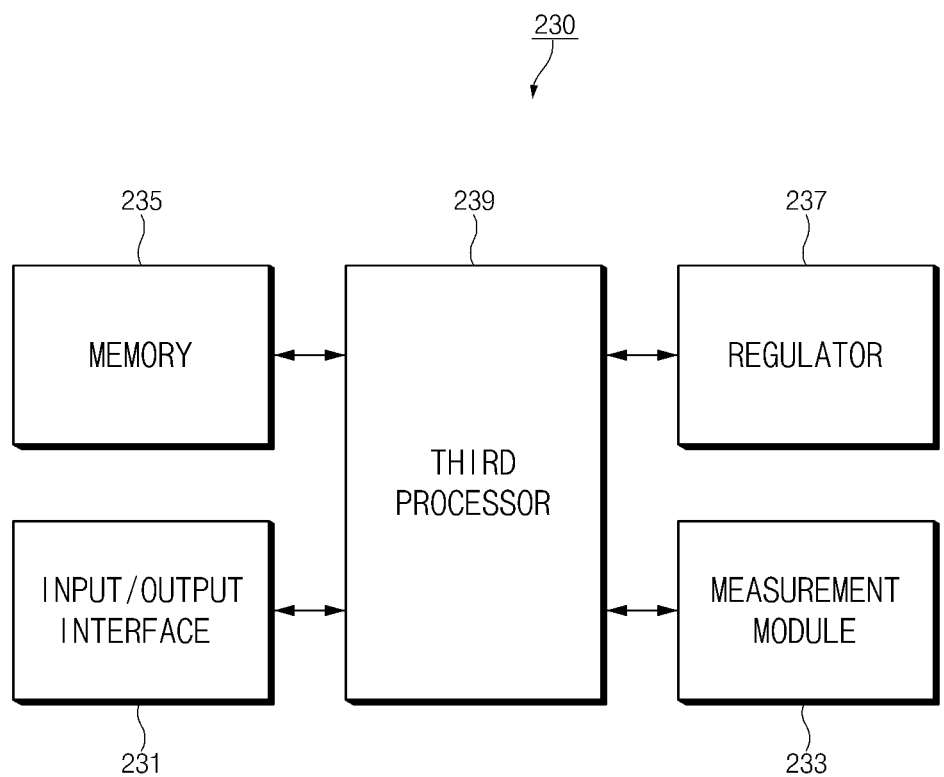
FIG. 4 illustrates a configuration of a battery gauge circuit of an electronic device according to an embodiment.

FIG. 4 illustrates a configuration of a battery gauge circuit of an electronic device according to an embodiment.

Referring to FIG. 4, a battery gauge circuit 230 may include an input/output interface 231, a measurement module (or a measurement circuit) 233, a memory 235, a regulator 237, and a third processor 239. The battery gauge circuit 230 may implemented as a system on chip.

The input/output interface 231 may receive a signal from another element of an electronic device 200 of FIG. 2 or may output a signal to the other element. For example, the input/output interface 231 may transmit a control signal for controlling a charging circuit 220 of FIG. 2 to the charging circuit 220.

The measurement module 233 may measure a state of a battery 210 of FIG. 2, such as at least one of a voltage ($V_{bat}$), a current ($I_{bat}$), and a temperature (T) of the battery 210, and may include a multiplexer and an analog digital convertor (ADC) to measure a state of the battery 210.

The memory 235 may store an adaptive charging algorithm (or program) for controlling the charging circuit 220 depending on a state of the battery 210.

The memory 235 may store information about the state of the battery 210, measured by the measurement module 233. For example, the memory 235 may include information (or a value) about a voltage ($V_{bat}$), a current ($I_{bat}$), a temperature (T), an SOC, an OCV, or a capacity (or a chemical capacity) (Q) of the battery 210.

The regulator 237 may control power supplied to the battery gauge circuit 230. For example, the regulator 237 may control power supplied from the battery 210 or an external power supply to convert the power into power for operating each element of the battery gauge circuit 230, and may supply the converted power to each element of the battery gauge circuit 230.

The third processor 239 may control an overall operation of the battery gauge circuit 230, may be a sub-processor for controlling a charging operation of the electronic device 200, may control an operation of the battery gauge circuit 230 depending on a command of a first processor 240 of FIG. 2, may control at least one of the input/output interface 231, the measurement module 233, the memory 235, and the regulator 237 to check a state of the battery 210 and may control the charging circuit 220 to charge the battery 210.

The third processor 239 may control the measurement module 233 to obtain data about a state of the battery 210. For example, the third processor 239 may receive data associated with a voltage ($V_{bat}$), a current ($I_{bat}$), and a temperature (T) of the battery 210 from the measurement module 233, and may calculate information about an SOC, an OCV, and capacity (e.g., chemical capacity) (Q) using the data associated with the voltage ($V_{bat}$), the current ($I_{bat}$), and the temperature (T). Thus, the third processor 239 may generate (or determine) state information corresponding to a state of the battery 210. The third processor 239 may transmit the generated state information of the battery 210 to the first processor 240, which may determine a charging parameter using the state information and may control the charging circuit 220 using the determined charging parameter.

According to another embodiment, the third processor 239 may execute the adaptive charging algorithm (or program) stored in the memory 235, and may determine a charging parameter using the adaptive charging algorithm. In other words, the third processor 239 may execute the adaptive charging algorithm and may determine a charging algorithm, without through the first processor 240. The third processor 239 may generate a battery model (or model data) (e.g., a battery degradation model) using information about a state of the battery 210, may predict a state of the battery 210 over time through the battery model, may obtain data associated with a voltage ($V_{bat}$), a current ($I_{bat}$), and a temperature (T) of the battery 210 using the measurement module 233 and may calculate information about an SOC, an OCV, and capacity (e.g., chemical capacity) (Q) using the obtained data, and may determine a charging parameter based on the battery model and the information about the state of the battery 210, by substituting the information into the battery model. The third processor 239 may control the charging circuit 220 depending on the determined charging parameter, such as by transmitting a control signal including the determined charging parameter to the charging circuit 220.

The third processor 239 may control the regulator 237 to change power supplied to the battery gauge circuit 230 to power for operating each element of the battery gauge circuit 230.

According to another embodiment, the third processor 239 and the first processor 240 may be implemented as one processor, in which case the one processor may directly control the other elements (e.g., the measurement module 233, the memory 235, and the regulator 237) of the battery gauge circuit 230.

The electronic device 200 may prevent the battery 210 from deteriorating in capacity (or performance) by verifying a state of the battery 210 when charging the battery 210 and controlling an amount of current or a level of voltage for charging the battery 210 based on the verified state of the battery 210. As a main processor and a sub-processor of the electronic device 200 complement each other to calculate a charging parameter depending on an amount of calculation (or power consumption) for calculating a charging parameter for charging the battery 210, the electronic device 200 may reduce additional power consumption.

Figure 5:
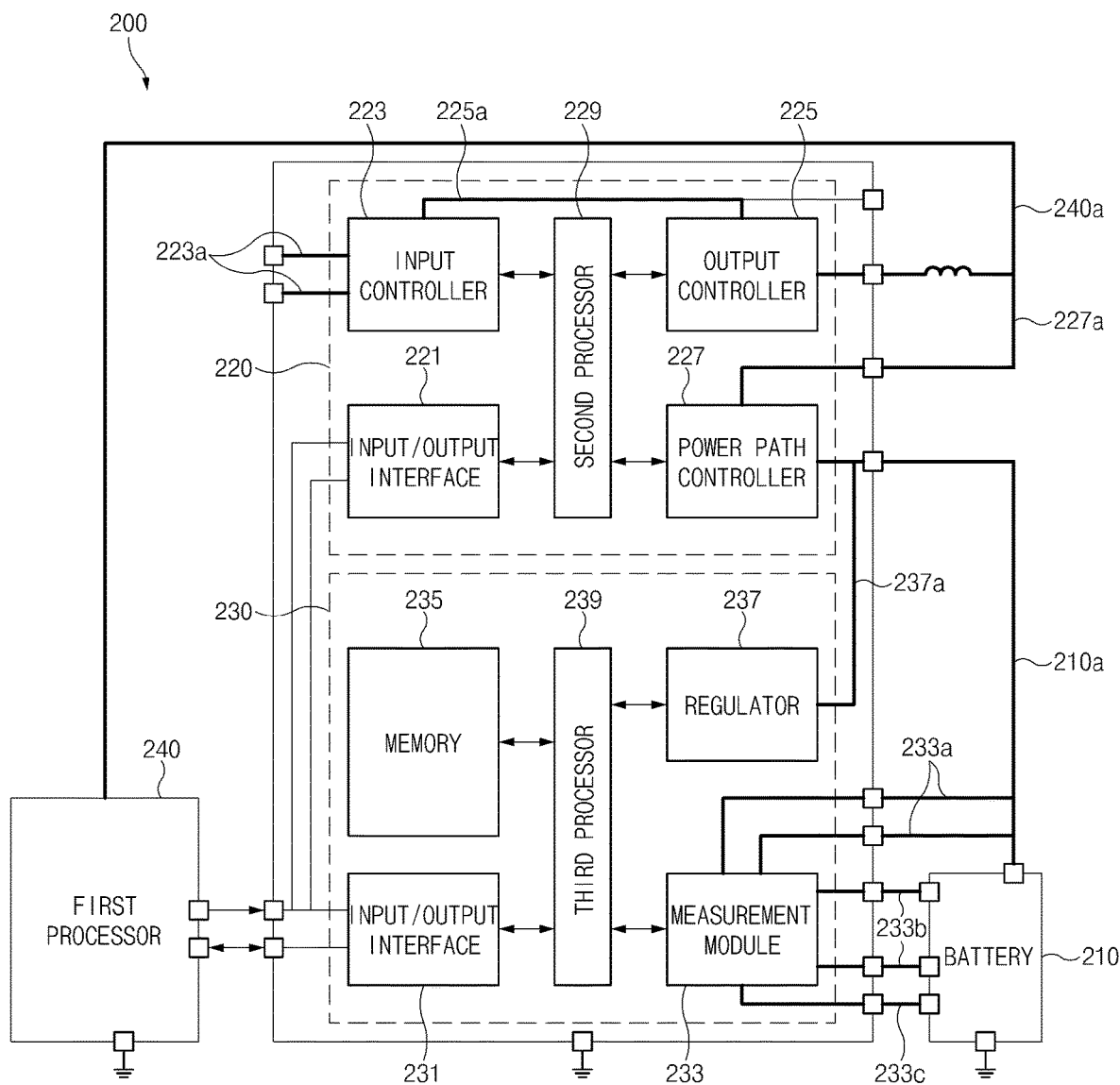
FIG. 5 illustrates a state in which respective elements of an electronic device are connected with each other according to an embodiment.

FIG. 5 illustrates a state in which respective elements of an electronic device are connected with each other according to an embodiment.

Referring to FIG. 5, a charging circuit 220 and a battery gauge circuit 230 of an electronic device 200 may be a PMIC for controlling charging of a battery 210. The electronic device 200 may include power lines 223a, 225a, 227a, 237a, 210a, and 240a which transmit power to respective elements of the electronic device 200, and may include measurement lines 233a, 233b, and 233c for measuring a state of the battery 210.

The electronic device 200 may receive power through the first power line 223a from an external power supply. An input controller 223 may supply power to an output controller 225 through the second power line 225a. The output controller 225 may supply power to a power path controller 227 through the third power line 227a and may supply power to a first processor 240 through the fourth power line 240a. The power path controller 227 may supply power to the battery 210 through the fifth power line 210a and may supply power to a regulator 237 of the battery gauge circuit 230 through the sixth power line 237a.

The battery 210 may supply power to the regulator 237 and the system (e.g., the first processor 240) through the fourth power line 240a, the fifth power line 210a, and the sixth power line 237a when charged.

According to an embodiment, a measurement module 233 of the electronic device 200 may measure current which flows to the battery 210 through the first measurement line 233a, may measure a voltage of both ends of the battery 210 through the second measurement line 233b, and may measure a temperature of the battery 210 through the third measurement line 233c.

An electronic device according to an embodiment may include a battery, a charging circuit configured to charge the battery, and a measurement circuit configured to measure a state of the battery, and a processor configured to be electrically connected with the battery, the charging circuit, and the measurement circuit. The processor may be configured to charge the battery using the charging circuit set by a first charging parameter, determine state information corresponding to the state of the battery based on data associated with the state of the battery, the state being obtained using the measurement circuit, determine a second charging parameter for maintaining an SOH of the battery based on the state information, and charge the battery using the charging circuit set by the second charging parameter.

The processor may be configured to determine at least one of a current value and a voltage value supplied to the battery as the second charging parameter using the charging circuit such that loss of a capacity of the battery meets a specified condition.

The processor may be configured to generate model data associated with an SOH of the battery based on at least a portion of the state information before determining the second charging parameter.

The processor may be configured to generate, as at least a portion of generating the model data, a first function for calculating loss of a capacity of the battery based at least in part on the state information, a second function for setting a charging condition of the battery, and a third function for predicting the loss of the capacity of the battery in a state in which the charging condition is met, based on at least one of the first function and the second function.

The charging condition may be a condition where a state of charge (SOC) of the battery meets a specified SOC during a specified time.

The processor is configured to filter a model parameter for generating the model data based at least in part on the state information and generate the model data based at least in part on the model parameter.

The processor is configured to perform verifying the state information and determining the second charging parameter per specified period.

When a load of the processor meets a specified condition, the measurement circuit may be configured to perform at least some of operations performed by the processor.

The state information may include at least one of information associated with a voltage of the battery, a current of the battery, an SOC of the battery, an OCV of the charging circuit, and a capacity of the battery.

An electronic device according to an embodiment may include a battery, a charging circuit, and a measurement circuit configured to be electrically connected with the battery and the charging circuit. The measurement circuit may be configured to charge the battery using the charging circuit set by a first charging parameter, determine state information corresponding to a state of the battery based on data associated with the state of the battery, determine a second charging parameter for reducing loss of a capacity of the battery based on the state information, and charge the battery using the charging circuit set by the second charging parameter.

The charging circuit may be configured to determine at least one of a current value and a voltage value supplied to the battery as the second charging parameter using the charging circuit such that the loss of the capacity of the battery meets a specified condition.

The measurement circuit may be configured to generate model data associated with the loss of the capacity of the battery based at least in part on the state information before determining the second charging parameter.

The measurement circuit may be configured to, as at least a portion of generating the model data, generate a first function for calculating the loss of the capacity of the battery based at least in part on the state information, generate a second function for setting a charging condition of the battery, and generate a third function for predicting the loss of the capacity of the battery in a state in which the charging condition is met, based on at least one of the first function and the second function.

The charging condition may be a condition where an SOC of the battery meets a specified SOC during a specified time.

The measurement circuit may be configured to filter a model parameter for generating the model data based at least in part on the state information and generate the model data based at least in part on the model parameter.

The measurement circuit may be configured to perform verifying the state information and determining the second charging parameter per specified period.

The electronic device may further include a processor configured to perform, when a load of the measurement circuit meets a specified condition, at least some of operations performed by the measurement circuit.

The data associated with the state of the battery may include at least one of information associated with a voltage of the battery, a current of the battery, an SOC of the battery, an OCV of the charging circuit, and a capacity of the battery.

Figure 6A:
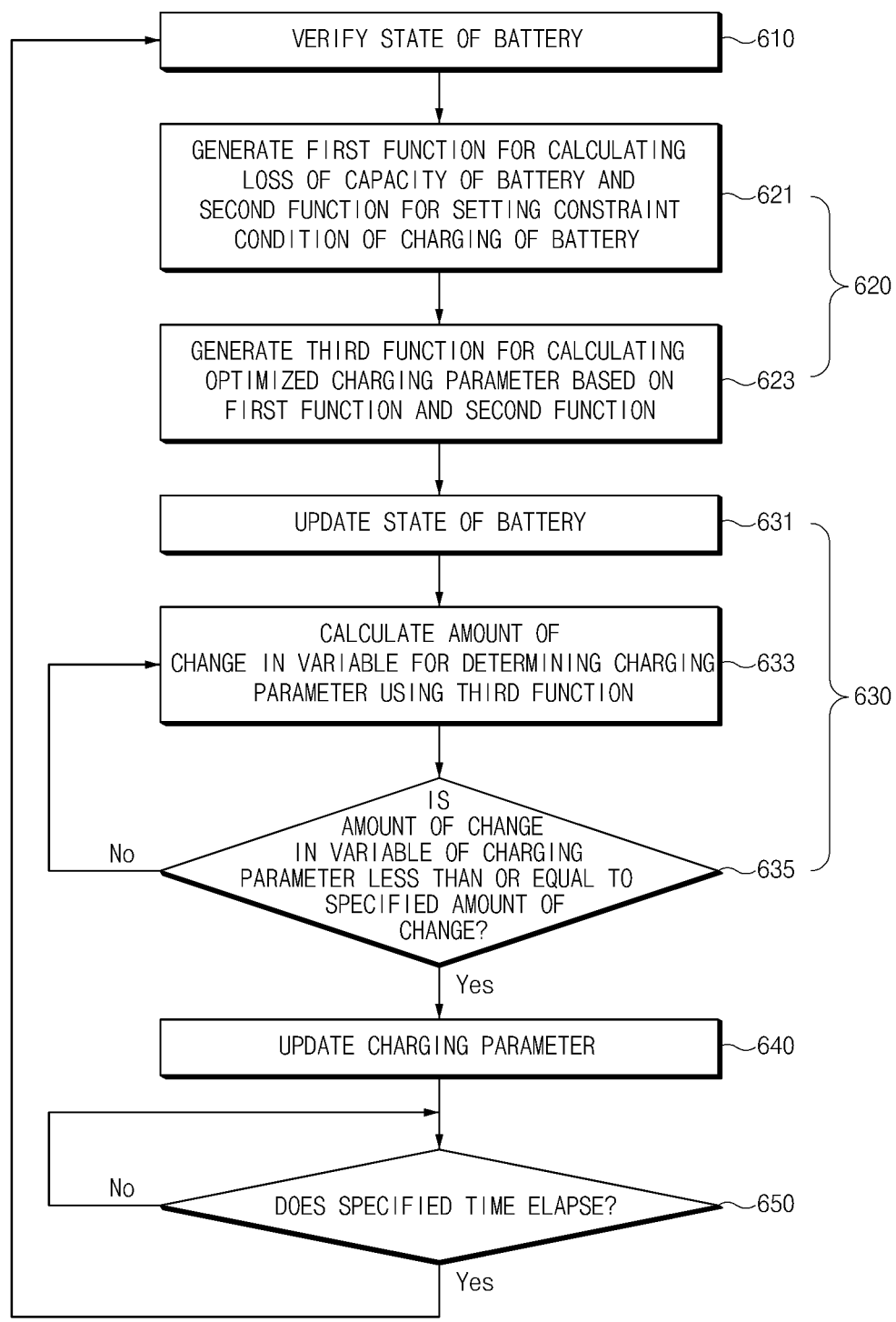
FIG. 6A illustrates a method for determining a charging parameter for charging a battery of an electronic device according to an embodiment.

FIG. 6A illustrates a method for determining a charging parameter for charging a battery of an electronic device according to an embodiment.

In step 610, a first processor 240 of FIG. 1 may verify a state of a battery 210 through a battery gauge circuit 230 and may determine (or verify) state information corresponding to the verified state of the battery 210, such as an initial state of the battery 210.

In step 620, the first processor 240 (or the battery gauge circuit 230) may generate a function for determining an optimized charging parameter.

In step 621, the first processor 240 (or the battery gauge circuit 230) may generate a first function for calculating loss $Q_{loss}$ of a capacity of the battery 210. The battery gauge circuit 230 may generate a battery model associated with an SOH of the battery 210 based on state information of the battery 210. For example, the first processor 240 may calculate the loss $Q_{loss}$ of the capacity of the battery 210 using Equation (1) as follows.

$$Q_{loss}(t) = \int_0^{t_{const}} i_{sei} dt - \int_0^{t} i_{sei} dt \quad (1)$$

The loss $Q_{loss}(t)$ of the capacity of the battery 210 at the left-hand side of Equation (1) above may denote loss of a capacity of an undated battery degradation model. $i_{sei}$ may denote current which flows by a solid electrolyte interphase (SEI) generated in an internal electrode of the battery 210. $t_{const}$ may denote a specified time. A value of integrating $i_{sei}$ until the specified time may denote the loss of the capacity of the battery degradation model of the specified time. $i_{sei}$ may be calculated by Equation (2) as follows.

$$i_{sei} = -i_{0,sei} * \exp\left(\frac{-\alpha * F}{R * T} * \eta_{sei}\right) \quad (2)$$

$i_{0,sei}$ may denote exchange current density, a may denote an ambipolar charge movement coefficient, R may denote a gas constant, F may denote a Faraday constant, and T may denote a temperature of the battery 210, measured by a measurement module 233 included in the battery gauge circuit 230. $\eta_s$ may be obtained by Equation (3) as follows.

$$\eta_{sei} = \eta_n + U_n - U_{sei} \quad (3)$$

$U_n$ and $U_{sei}$ may denote negative equilibrium potential and equilibrium potential of an SEI reaction, respectively. $t_{in}$ may be obtained by Equation (4) as follows.

$$\eta_n = \frac{R*T}{\alpha*F} * a \, \sinh\left(\frac{i_{total} - i_{sei}}{2*i_{0,n}}\right) \quad (4)$$

α may denote an ambipolar charge movement coefficient, and R, T, and F may be the same as R, T, and F of Equation (2). $i_{0,n}$ may denote negative exchange current density, and $i_{bat}$ may denote a current of the battery 210, measured by the measurement module 233 included in the battery gauge circuit 230. Thus, $i_{sei}$ may be obtained by the Equation (5) as follows.

$$i_{sei} = -i_{0,sei} * \exp\left(\frac{\alpha * F}{R * T} * (U_{sei} - U_n) - a\, \sinh\left(\frac{i_{total} - i_{sei}}{2 * i_{0,n}}\right)\right) \quad (5)$$

Thus, the first processor 240 may substitute Equation (5) into $i_{sei}$ of Equation (1) to generate the first function for calculating the loss $Q_{loss}$ of the capacity of the battery 210.

Referring back to FIG. 6A, in step 621, the first processor 240 (or the battery gauge circuit 230) may generate a second function for setting a specified constraint condition g of charging of the battery 210, such as by setting a condition where the SOC of the battery meets a specified SOC to the specified constraint condition g during a specified time using Equation (6) as follows.

$$g = SOC(t_{const}) - SOC_{const} = 0 \quad (6)$$

$t_{const}$ may denote the specified time, and $SOC(t_{const})$ may denote an SOC of the specified time. $SOC_{const}$ may denote the specified SOC. The first processor 240 may set the battery 210 to be charged to 100% in a maximum time tmax.

The first processor 240 (or the battery gauge circuit 230) may generate a battery model (or model data) (e.g., a battery degradation model) for predicting a state of the battery 210. The battery model may be represented as, for example, a specified function f, and the specified function f may be defined as a plurality of functions $f_1$ to $f_N$ for accomplishing a specified purpose. In other words, the function f indicating the battery model may be represented in Equation (7) as follows.

$$f = f_1 + f_2 + \ldots + f_N \quad (7)$$

For example, in step 623, the first processor 240 may generate a third function (e.g., f) for a battery model capable of predicting loss of a capacity of the battery 210 under a specified constraint condition based on the first function (e.g., $f_1$) and the second function (e.g., $f_2$). The third function may be a Lagrange function L generated by Equation (8) as follows.

$$L = Q_{loss}(t) + L_x * (SOC(t_{const}) - SOC_{const}) \quad (8)$$

$L_x$ may be a variable of the Lagrange function L indicating a battery model where a capacity of the battery 210 predicts loss. Functions $f_3$ to $f_N$ for accomplishing a specified purpose may be replaced or added to the Lagrange function L. For example, Equation (9) below may be added to calculate a value quickly optimized in an optimization process using the Lagrange function L.

$$f_3 = \sigma * (I_1^2 + I_2^2) \quad (9)$$

$I_1$ and $I_2$ may denote variables for calculating a charging parameter (e.g., current I). σ may be determined based on a minimum value of the charging parameter for charging the battery 210. The minimum value of the charging parameter may be, for example, the lowest current value capable of being set to charge the battery 210.

In step 630, the first processor 240 (or the battery gauge circuit 230) may determine an optimized charging parameter using the third function. For example, the first processor 240 may determine a charging parameter for minimizing loss of a capacity of the battery 210 under a specified constraint condition, such as determining at least one of a current value I or a voltage value V supplied to the battery 210 as the charging parameter using the charging circuit 220 such that the loss of the capacity of the battery 210 meets a specified condition, such as a minimum value of the loss of the capacity of the battery 210.

In step 633, the first processor 240 may calculate an amount of change in a variable of a charging parameter using the third function. The first processor 240 may calculate a charging parameter (e.g., a charging current I) using Equation (10) as follows.

$$I = I_1 - I_2 * t \quad (10)$$

$I_1$ and $I_2$ may denote variables for determining the charging parameter I. In other words, $I_1$ and $I_2$ may determine a shape where the charging parameter I is changed. The first processor 240 may determine $I_1$ and $I_2$ such that the loss $Q_{loss}$ of the capacity of the battery 210 is minimal under the specified constraint condition g using Equation (11) as follows.

$$\min_{I_1, I_2} L = Q_{loss}(t) + L_x * (SOC(t_{const}) - SOC_{const}) \quad (11)$$

The first processor 240 may substitute Equation (9) into $i_{sei}$ of the first function for calculating the loss $Q_{loss}$ of the capacity of the battery 210 and may calculate a Gradients matrix ∇L and a Hessian matrix H using Equation (12) below by using $I_1$ and $I_2$ as a plurality of variables for the first function.

$$\nabla L = \begin{pmatrix} \frac{\partial L}{\partial I_1} \\ \frac{\partial L}{\partial I_2} \\ \frac{\partial L}{\partial I_x} \end{pmatrix} \quad H = \begin{pmatrix} \frac{\partial^2 L}{\partial I_1 \partial I_1} & \frac{\partial^2 L}{\partial I_1 \partial I_2} & \frac{\partial^2 L}{\partial I_1 \partial L_x} \\ \frac{\partial^2 L}{\partial I_2 \partial I_1} & \frac{\partial^2 L}{\partial I_2 \partial I_2} & \frac{\partial^2 L}{\partial I_2 \partial L_x} \\ \frac{\partial^2 L}{\partial L_x \partial I_1} & \frac{\partial^2 L}{\partial L_x \partial I_2} & \frac{\partial^2 L}{\partial L_x \partial L_x} \end{pmatrix} \quad (12)$$

The first processor 240 may calculate an amount $\Delta I_1$ of change of $I_1$, an amount $\Delta I_2$ of change of $I_2$, and an amount $\Delta L_x$ of change of $L_x$ using Equation (13) as follows.

$$\begin{pmatrix} dI_1 \\ dI_2 \\ dL_x \end{pmatrix} = -H^{-1} * \nabla L \quad (13)$$

In step 633, the first processor 240 may calculate (or update) variables I1 and I2 of a charging parameter and a variable Lx of the Lagrange function L using Equation (14) as follows.

$$I_1 = I_1 + dI_1\ \ I_2 = I_2 + dI_2\ \ L_x = L_x + dL_x \quad (14)$$

For example, variables (e.g., $I_1$ and $I_2$) for calculating a charging parameter may increase the number of the variables (e.g., $I = I_1 - I_2 * t - I_3 * t^2$). The number of the charging parameters may be determined according to performance of a processor which calculates the variables. For example, a charging voltage V as well as a charging current I may be set to a charging parameter.

In step 635, the first processor 240 may determine whether each of the variables $I_1$ and $I_2$ of the charging parameter converges. For example, the first processor 240 may determine whether each of the amounts $\Delta I_1$ and $\Delta I_2$ of change in the variables $I_1$ and $I_2$ of the charging parameters is less than or equal to a specified amount of change to determine whether each of the variables $I_1$ and $I_2$ of the charging parameter converges. When each of the variables $I_1$ and $I_2$ of the charging parameter does not converge (e.g., when each of the amounts $\Delta I_1$ and $\Delta I_2$ of change in the variables $I_1$ and $I_2$ of the charging parameter is greater than the specified amount of change) (No), the first processor 240 may return to step 633 and re-calculate the amounts $\Delta I_1$ and $\Delta I_2$ of change in the variables $I_1$ and $I_2$ of the charging parameter.

When each of the variables $I_1$ and $I_2$ of the charging parameter converges (e.g., when each of the amounts $\Delta I_1$ and $\Delta I_2$ of change in the variables $I_1$ and $I_2$ of the charging parameter is less than or equal to the specified amount of change) (Yes), in step 640, the first processor 240 may calculate (or update) the charging parameter I using the calculated variables $I_1$ and $I_2$ of the charging parameter.

The first processor 240 (or the battery gauge circuit 230) may set an initial value and may calculate an optimized variable of the charging parameter. A time taken for the first processor 240 to calculate the optimized variable depending on the initial value may be increased. The first processor 240 may calculate the optimized variable of the charging parameter using a third function (e.g., f or L) of Equation (15) below including a function (e.g., $f_3$) of Equation (9) to reduce the time taken.

$$L = Q_{loss}(t) + \sigma^*(I_1^2 + I_2^2) + L_x^*(SOC(t_{const}) - SOC_{const}) \quad (15)$$

In other words, the first processor 240 may calculate a charging parameter for minimizing loss of a capacity of the battery 210 using Equation (16) as follows.

$$\min_{I_1, I_1} L = \int_0^{t_{const}} i_{sei} dt - \int_0^t i_{sei} dt + \sigma^*(I_1^2 + I_2^2) + L_x^*(SOC(t_{const}) - SOC_{const}) \quad (16)$$

In step 650, the first processor 240 may update the optimized variable of the charging parameter at a specified period (e.g., 10 seconds) and may determine whether a specified time elapses. When the specified time elapses (Yes), in step 610, the first processor 240 may verify a state of the battery 210 through the battery gauge circuit 230. When the specified time does not elapse (No), in step 650, the first processor 240 may repeatedly verify whether the specified time elapses. The specified period may be determined according to, for example, performance of the processor which calculates the charging parameter.

When generating a battery model (or model data) (e.g., a battery degradation model), the first processor 240 may filter and estimate a model parameter (e.g., a resistance value of the battery 210) based on generating the battery model and may generate the battery model using the estimated model parameter. In other words, the first processor 240 may filter a model parameter for generating a battery model based on state information of the battery 210 and may generate the battery model based on the model parameter. A method for filtering the model parameter may be applied when a specified constraint condition capable of being included in the battery model is related to a voltage of the battery 210. A filter for filtering the model parameter may be, for example, a Kalman filter.

The first processor 240 may optimize a time when the battery 210 is charged, and may optimize a charging parameter such that a charging state of the battery 210 is a specified value or more in a specified time, or such that a charging state of the battery 210 is maximal.

The battery gauge circuit 230 may determine a charging parameter rather than the first processor 240. As described with reference to FIGS. 2 and 3, the method for determining the charging parameter at the battery gauge circuit 230 may be similar to a method of the first processor 240.

Figure 6B:
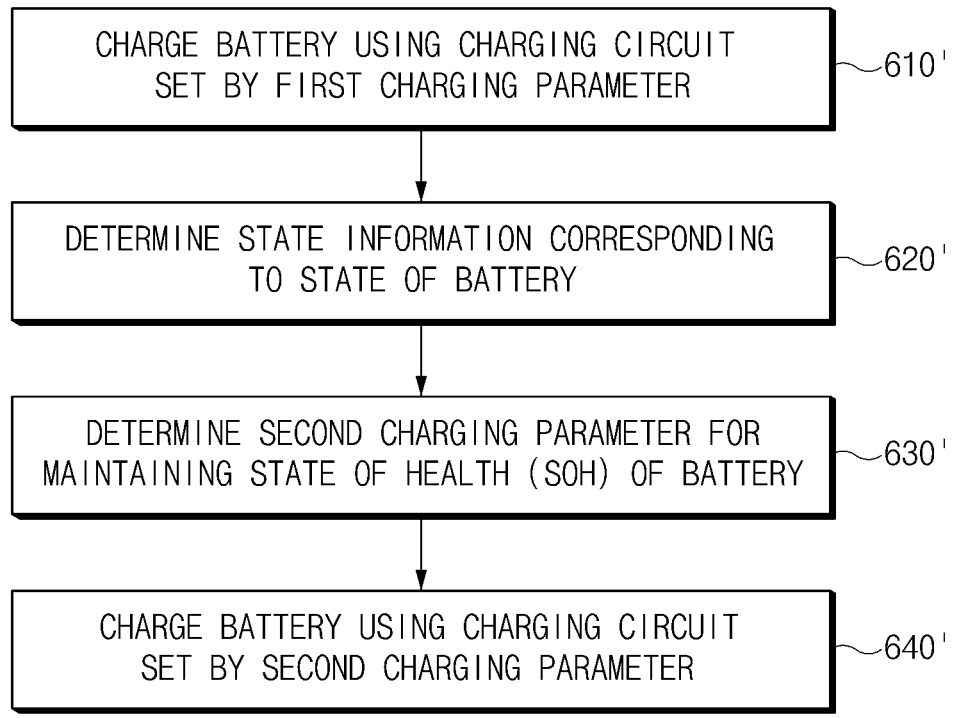
FIG. 6B illustrates a method for changing a charging parameter of an electronic device and charging a battery according to an embodiment.

FIG. 6B illustrates a method for changing a charging parameter of an electronic device and charging a battery according to an embodiment.

Referring to FIG. 6B, an electronic device 200 may update a charging parameter of a charging circuit 220 of FIG. 2 from a first charging parameter to a second charging parameter and may charge a battery 210 of FIG. 2 using the updated charging parameter.

In step 610', the electronic device 200 may charge the battery 210 using the charging circuit 220 set by the first charging parameter.

In step 620', the electronic device 200 may determine state information corresponding to a state of the battery 210. For example, the electronic device 200 may obtain data about the state of the battery 210 through a battery gauge circuit 230 of FIG. 2 and may determine the state information corresponding to the state.

In step 630', the electronic device 200 may determine the second charging parameter for maintaining an SOH of the battery 210. For example, the electronic device 200 may determine the second charging parameter based on the state information of the battery 210.

In step 640', the electronic device 200 may charge the battery 210 using the charging circuit 220 set by the second charging parameter.

Figure 7:
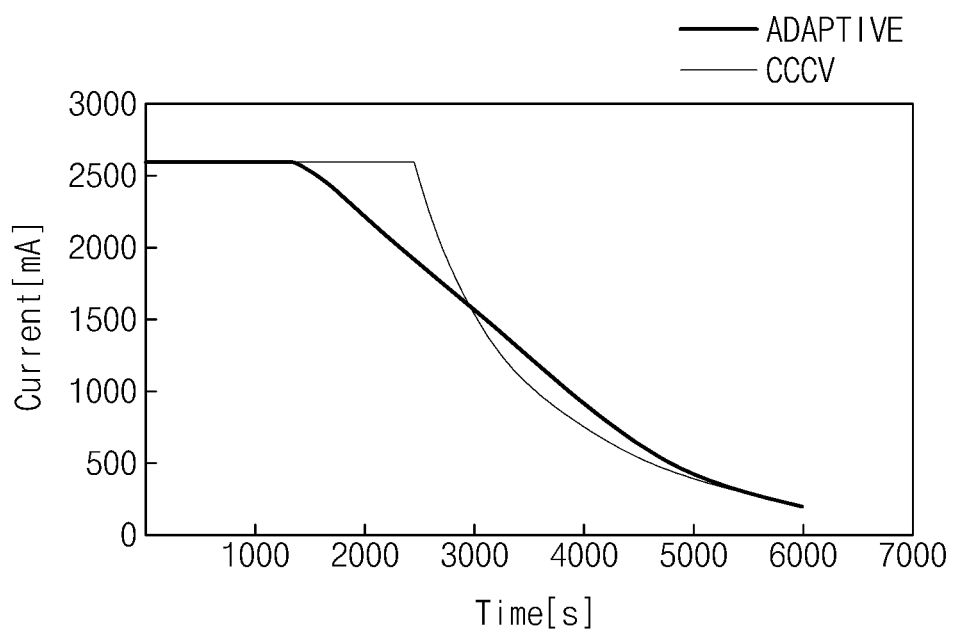
FIGS. 7 and 8 illustrate a current and voltage of each of an adaptive charging method of an electronic device and a CCCV charging method according to an embodiment.
Figure 8:
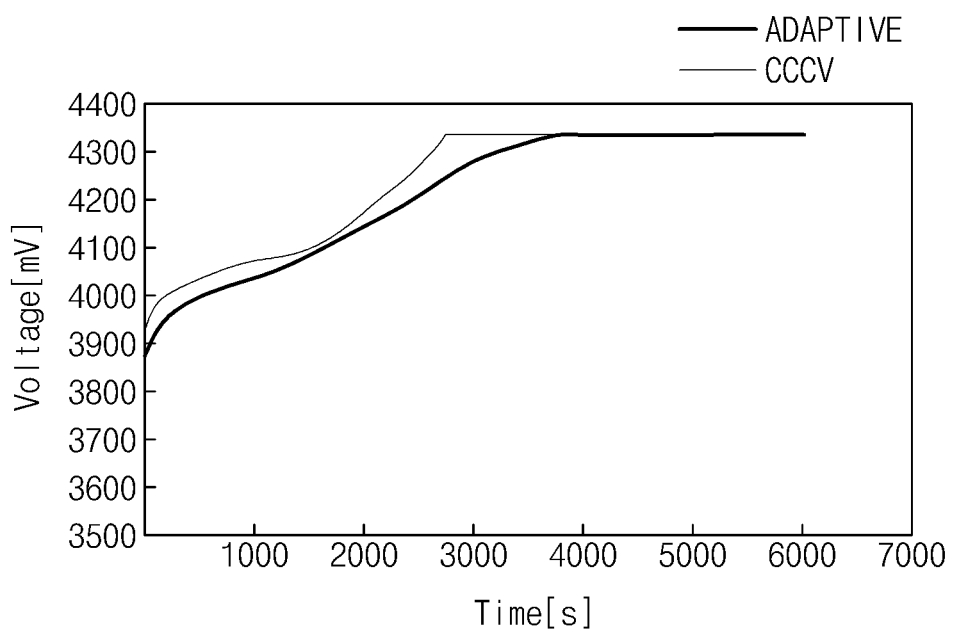

FIGS. 7 and 8 illustrate a current and voltage of each of an adaptive charging method of an electronic device and a CCCV charging method according to an embodiment of the present disclosure.

Referring to FIGS. 7 and 8, an adaptive charging method (ADAPTIVE) of an electronic device 200 of FIG. 2 may verify a state of a battery 210 of FIG. 2 at a specified period and may determine a charging parameter depending on the state of the battery 210, verified at the specified period, thus charging the battery 210 using the determined charging parameter. The CCCV charging method may charge a battery with a specified current (or a constant current) before a specified time and may charge the battery while maintaining a specified voltage (or a constant voltage) after the specified time.

Referring to FIG. 7, when a charging current is supplied to the battery 210, a charging voltage may be supplied to the battery 210. Since the adaptive charging method (ADAPTIVE) of the electronic device 200 determines the charging parameter depending on the state of the battery 210, this method may take less time when supplying a maximum charging current to the battery 210 than the CCCV charging method (CCCV). Referring to FIG. 8, the adaptive charging method (ADAPTIVE) of the electronic device 200 may take less time when a maximum voltage is supplied to the battery 210 than the CCCV charging method (CCCV). Thus, since a time when a maximum current and a maximum voltage are supplied to the battery 210 is reduced, the adaptive charging method (ADAPTIVE) of the electronic device 200 may prevent deterioration in performance of the battery 210 (e.g., reduction of a capacity of the battery 210).

Figure 9:
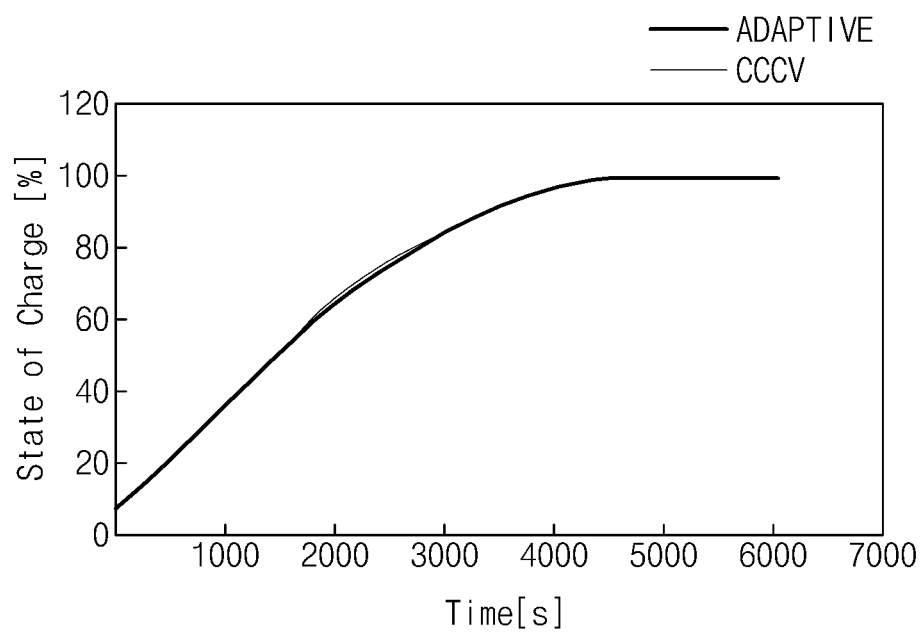
FIG. 9 illustrates an SOC of a battery depending on an adaptive charging method of an electronic device and a CCCV charging method according to an embodiment.

FIG. 9 illustrates an SOC of a battery depending on an adaptive charging method of an electronic device and a CCCV charging method according to an embodiment of the present disclosure.

Referring to FIG. 9, an adaptive charging method (ADAPTIVE) of an electronic device 200 of FIG. 2 may have a lower increase rate in an SOC of a battery 210 of FIG. 2 than a CCCV charging method, but may take a similar amount of time when the battery 200 is charged to 100% to the CCCV charging method. Thus, the adaptive charging method (ADAPTIVE) of the electronic device 200 may prevent deterioration in performance of the battery 210 and may take a similar amount of time to charge the battery 210 to the CCCV charging method (CCCV).

Figure 10:
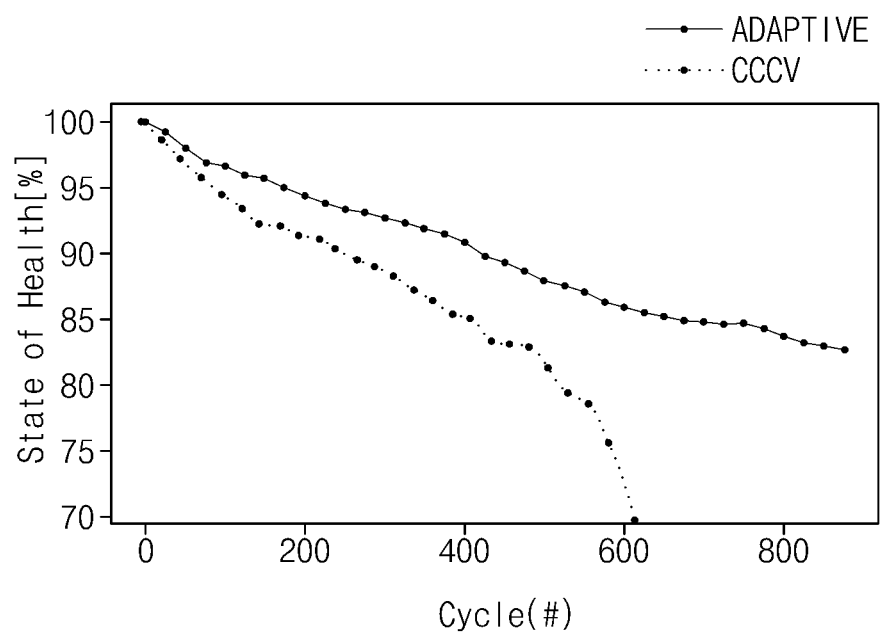
FIG. 10 illustrates an SOH of a battery according to a charging and discharging cycle of an adaptive charging method of an electronic device and a CCCV charging method according to an embodiment.

FIG. 10 illustrates an SOH of a battery according to a charging and discharging cycle of an adaptive charging method of an electronic device and a CCCV charging method according to an embodiment of the present disclosure.

Referring to FIG. 10, reduction of a capacity of a battery 210 of FIG. 2 according to an adaptive charging method (ADAPTIVE) of an electronic device 200 of FIG. 2 may be less than reduction of a capacity of a battery according to a CCCV charging method (CCCV). Comparing the adaptive charging method (ADAPTIVE) of the electronic device 200 with the CCCV charging method (CCCV) with respect to a specified remaining capacity of a battery, the battery 210 may be maintained at greater than or equal to the specified remaining capacity in the adaptive charging method (ADAPTIVE) of the electronic device 200 after the battery 210 is charged 1000 times or more (cycles), but the battery may be rapidly reduced to the specified remaining capacity or less in the CCCV charging method after the battery is charged 400 times. Thus, an SOH of the battery 210 according to the adaptive charging method (ADAPTIVE) of the electronic device 200 may be longer than an SOH of the battery according to the CCCV charging method.

The electronic device 200 according to embodiments herein may minimize loss of a capacity of the battery 210 and may avoid supply of an excessive current or voltage to the battery 210 by verifying a state of the battery 210, determining a charging parameter based on the state, and charging the battery 210 depending on the charging parameter. Thus, the electronic device 200 may safely charge the battery 210.

An SOH of a rechargeable battery may be relatively increased, and the electronic device may reduce additional power consumption as a main processor and a sub-processor of the electronic device 200 complement each other to calculate a charging parameter depending on an amount of calculation (or power consumption) for calculating the charging parameter for charging the battery 210.

According to embodiments, at least a part of an apparatus (e.g., modules or functions thereof) or a method (e.g., operations) may be implemented by instructions stored in a computer-readable storage media in the form of a program module. The instruction, when executed by a processor, may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

A method performed by a program stored in a storage medium according to embodiments may include charging a battery using a charging circuit set by a first charging parameter, determining state information corresponding to a state of the battery based on data associated with the state of the battery, obtained using a measurement circuit, determining a second charging parameter for maintaining an SOH of the battery based on the state information, and charging the battery using the charging circuit set by the second charging parameter.

In the method performed by the program stored in the storage medium according to embodiments, the determined second charging parameter may include at least one of a current value and a voltage value supplied to the battery using the charging circuit such that loss of a capacity of the battery meets a specified condition.

Each element (e.g., a module or a program module) according to embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. Operations executed by modules, program modules, or other elements may be executed by a successive method, a parallel method, a repeated method, or a heuristic method, or at least one part of operations may be executed in different sequences or omitted. Other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device, comprising:
   a battery;
   a charging circuit configured to charge the battery;
   a measurement circuit configured to measure a state of the battery; and
   a processor configured to be electrically connected with the battery, the charging circuit, and the measurement circuit,
   wherein the processor is configured to:
   charge the battery using the charging circuit set by a first charging parameter;
   determine state information corresponding to the state of the battery based on data associated with the state of the battery, the state being obtained using the measurement circuit;
   determine a second charging parameter for reducing loss of a capacity of the battery based on the state information;
   charge the battery using the charging circuit set by the second charging parameter;
   generate model data associated with the loss of the capacity of the battery based on at least a portion of the state information before determining the second charging parameter;
   filter a model parameter for generating the model data based at least in part on the state information; and
   generate the model data based at least in part on the model parameter.

2. The electronic device of claim 1,
wherein the processor is further configured to determine at least one of a current value or a voltage value supplied to the battery as the second charging parameter using the charging circuit, such that the loss of the capacity of the battery meets a specified condition.

3. The electronic device of claim 1, wherein the processor is further configured to:
generate, as at least a portion of generating the model data, a first function for calculating the loss of the capacity of the battery based at least in part on the state information;
generate a second function for setting a charging condition of the battery; and
generate a third function for predicting the loss of the capacity of the battery in a state in which the charging condition is met, based on at least one of the first function and the second function.

4. The electronic device of claim 3, wherein the charging condition is when a state of charge (SOC) of the battery meets a specified SOC during a specified time.

5. The electronic device of claim 1, wherein the processor is configured to verify the state information and determine the second charging parameter per specified period.

6. The electronic device of claim 1, wherein the measurement circuit is further configured to perform at least some operations performed before charging the battery by the processor, when a load of the processor meets a specified condition.

7. The electronic device of claim 1, wherein the state information comprises at least one of information associated with a voltage of the battery, a current of the battery, an SOC of the battery, an open-circuit voltage (OCV) of the charging circuit, and a capacity of the battery.

8. An electronic device, comprising:
a battery;
a charging circuit; and
a measurement circuit configured to be electrically connected with the battery and the charging circuit,
wherein the measurement circuit is configured to:
charge the battery using the charging circuit set by a first charging parameter;
determine state information corresponding to a state of the battery based on data associated with the state of the battery;
determine a second charging parameter for reducing loss of a capacity of the battery based on the state information;
charge the battery using the charging circuit set by the second charging parameter;
generate model data associated with the loss of the capacity of the battery based at least in part on the state information before determining the second charging parameter;
filter a model parameter for generating the model data based at least in part on the state information; and
generate the model data based at least in part on the model parameter.

9. The electronic device of claim 8, wherein the measurement circuit is further configured to determine at least one of a current value and a voltage value supplied to the battery as the second charging parameter using the charging circuit, such that the loss of the capacity of the battery meets a specified condition.

10. The electronic device of claim 8, wherein the measurement circuit is further configured to:
generate, as at least a portion of generating the model data, a first function for calculating the loss of the capacity of the battery based at least in part on the state information;
generate a second function for setting a charging condition of the battery, and
generate a third function for predicting the loss of the capacity of the battery in a state in which the charging condition is met, based on at least one of the first function and the second function.

11. The electronic device of claim 10, wherein the charging condition is when a state of charge (SOC) of the battery meets a specified SOC during a specified time.

12. The electronic device of claim 8, wherein the measurement circuit is further configured to verify the state information and determine the second charging parameter per specified period.

13. The electronic device of claim 8, further comprising:
a processor configured to perform at least some operations performed before charging the battery by the measurement circuit, when a load of the measurement circuit meets a specified condition.

14. The electronic device of claim 8, wherein the data associated with the state of the battery comprises at least one of information associated with a voltage of the battery, a current of the battery, an SOC of the battery, an OCV of the charging circuit, and a capacity of the battery.

15. A non-transitory computer-readable storage medium storing a program for performing a method, the method comprising:
charging a battery using a charging circuit set by a first charging parameter;
determining state information corresponding to a state of the battery based on data associated with the state of the battery, the state being obtained using a measurement circuit;
generating model data associated with the loss of the capacity of the battery based on at least a portion of the state information;
filtering a model parameter for generating the model data based at least in part on the state information;
generating the model data based at least in part on the model parameter;
determining a second charging parameter for reducing loss of a capacity of the battery based on the state information; and
charging the battery using the charging circuit set by the second charging parameter.

16. The non-transitory computer-readable storage medium of claim 15, wherein the determined second parameter includes at least one of a current value and a voltage value supplied to the battery using the charging circuit such that loss of a capacity of the battery meets a specified condition.

* * * * *